United States Patent [19]

Kassat et al.

[11] Patent Number: 4,489,775
[45] Date of Patent: Dec. 25, 1984

[54] DESUBLIMATOR FOR ISOLATING SUBLIMATION PRODUCTS FROM REACTION GASES

[75] Inventors: Harry Kassat, Bochum; Friedrich Wirth; Joachim Wagner, both of Ludwigshafen, all of Fed. Rep. of Germany

[73] Assignee: BASF Aktiengesellschaft, Ludwigshafen, Fed. Rep. of Germany

[21] Appl. No.: 287,783

[22] Filed: Jul. 28, 1981

[30] Foreign Application Priority Data

Aug. 6, 1980 [DE] Fed. Rep. of Germany ....... 3029744

[51] Int. Cl.³ .......... B01D 7/00; B01D 51/00; F28F 9/00; F28F 7/00
[52] U.S. Cl. .................. 165/67; 165/61; 165/68; 165/82; 165/111; 165/162; 165/172; 55/82; 55/269; 422/244
[58] Field of Search .......... 165/82, 81, 85, 67, 165/68, 69, 162, 61, 110, 111, DIG. 18; 55/82, 267, 269; 422/244; 248/49, 37.3

[56] References Cited

U.S. PATENT DOCUMENTS

| | | | |
|---|---|---|---|
| 3,529,662 | 9/1970 | Roe | 165/111 |
| 3,693,707 | 9/1972 | Richter | 165/111 |
| 3,750,418 | 8/1973 | Maudlin | 62/285 |
| 3,867,410 | 2/1975 | Brand et al. | 165/61 |
| 3,905,420 | 9/1975 | Wirth et al. | 165/82 |
| 3,934,645 | 1/1976 | Butts | 165/162 |
| 4,002,198 | 1/1977 | Wagner et al. | 165/61 |
| 4,252,772 | 2/1981 | Way | 55/82 |
| 4,265,301 | 5/1981 | Anderson | 165/162 |

FOREIGN PATENT DOCUMENTS 1113024 12/1967 Canada .................... 55/269

Primary Examiner—William R. Cline
Assistant Examiner—John K. Ford
Attorney, Agent, or Firm—Keil & Weinkauf

[57] ABSTRACT

Desublimator for isolating sublimation products from reaction gases, which consists of a closed housing and a plurality of rows of finned tubes accommodated horizontally and superposedly therein, successive superposed finned tubes being supported, and mutually spaced, with limited adjustability, by means of cage-like perforated sliding shoes surrounding them in a box-like manner, the sliding shoes of the individual finned tubes being directly stacked one above the other and resting loosely on common supporting girders anchored to the housing, and the supporting girders having, in cross-section, the outline of a triangle with its apex pointing downward.

7 Claims, 4 Drawing Figures

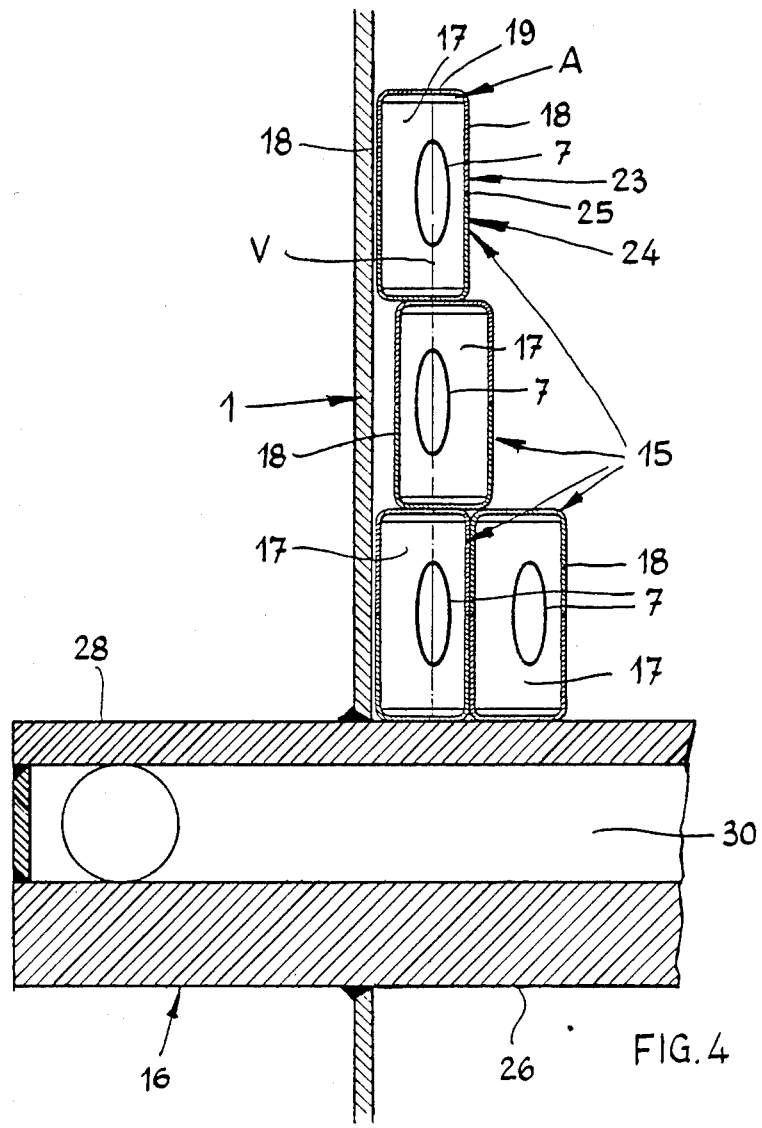

DESUBLIMATOR FOR ISOLATING SUBLIMATION PRODUCTS FROM REACTION GASES

The invention relates to a desublimator for isolating sublimation products from reaction gases, which consists of a closed housing for the reception or passage of the reaction gas and of a plurality of rows of finned tubes accommodated horizontally and superposedly therein, for alternate internal exposure to a heating medium or cooling medium, in which desublimator the reaction gas is passed downward crosswise to the flow of heating medium or cooling medium, the successive superposed finned tubes of each row being alternately connected together at one end, by a hairpin-shaped bend, and being provided, at the opposite end, with connections for introducing and discharging the heating medium or cooling medium, and the superposed tubes or rows of tubes being supported, and mutually spaced, with limited adjustability, by means of cage-like perforated sliding shoes surrounding them in a box-like manner at least in the end zones, the sliding shoes of the individual finned tubes of all rows of tubes or groups of tubes being directly stacked one above the other and resting loosely on common supporting girders anchored to the housing.

In a known desublimator of this type (U.S. Pat. No. 3,905,420), the supporting girders have a rectangular or square cross-section and are preferably composed of two U-girders welded to one another to form a closed hollow box profile.

If, with such a desublimator, the reaction gas, containing, for example, phthalic anhydride, is passed downward through the housing of the desublimator, which in some cases has advantages over the conventional opposite direction of flow of the reaction gas, the greater part of the sublimation product preferably separates out, during the cooling phase, in the region of the groups of finned tubes which are at the top of the housing. In the melting-off phase which follows the cooling phase, ie. which follows the charging with sublimation product, a certain self-purging effect occurs inasmuch as the sublimation product which runs off the upper rows of tubes flushes the lower rows of tubes clean. This accelerates the melting-off of the sublimation product, induced during the heating phase as a result of the rise in temperature, and at the same time has the effect that even those regions which are not accessible to direct heating are cleaned by being flushed.

However, it has been found that in the regions below the supporting girders of box-like cross section, "flushing shadows" occur during the heating or melting-off phase; within these shadows, the self-purging and washing effect mentioned above cannot occur. The sublimation product residues which remain within these flushing shadows are not only troublesome and undesirable per se, but in particular have the disadvantage that over a lengthy period they are converted to acid and in this way cause corrosion of the finned tubes, which can lead to considerable destruction, to leakages and, finally, to fire.

It is an object of the present invention to provide a support for the finned tubes or groups of finned tubes which avoids the flushing shadows described above and permits satisfactory run-off and distribution of the sublimation product, during melting-off, even below the supports.

We have found that this object is achieved, according to the invention, if the supporting girders have, in cross-section, the outline of a triangle with its apex pointing downward, preferably of an isosceles triangle standing on its apex.

Experiments have shown that only by means of the cross-sectional shape of the supporting girders which is proposed according to the invention is it possible to ensure that the sublimation product which drains off from the top during the melting-off phase runs along the mutally converging sides of the triangle toward the downward-pointing apex and drips off from there so as to distribute itself over the finned tubes below.

According to an advantageous further development of the invention, the essentially horizontal upper lengthwise face of the supporting girder is of slightly convex cross-section or is of roof-shaped cross-section, forming a flat lengthwise ridge. This facilitates satisfactory run-off of the sublimation product being melted and prevents any formation of residues on the top face of the supporting girder.

Advantageously, at least the lower lengthwise edge, corresponding to the apex of the triangle, of the supporting girder is rounded. Apart from the fact that in this way undesirable scoring on the sliding shoes, resulting from excessively high specific surface pressure, is avoided, we have found that the rounding of the bottom lengthwise edge favors run-off and dripping-off of the molten sublimation product.

The supporting girders can consist of a hollow profile, in a conventional manner; preferably, however, they consist of an extruded solid profile having a lengthwise through-bore. In either case, the inner cavity or lengthwise bore of the supporting girder can be connected, in a conventional manner, to a closed pipeline system for the passage of a heating medium, especially hot oil, during the melting-off phase, to prevent the sublimation product which is melting off from becoming cooled as it passes the supporting girder and thereby acquiring too high a viscosity, which interferes with satisfactory run-off.

Furthermore, it has proved adavantageous if additional supporting girders are also provided, in the region of the stack of sliding shoes, above the uppermost finned tube bundle; these girders prevent a vertical shift or distortion of the finned tube bundle and at the same time substantially contribute to stiffening the housing.

A preferred embodiment of the invention is described in more detail below with the aid of the drawing. In this:

FIG. 4 shows a vertical lengthwise section through a supporting girder with several superposedly stacked sliding shoes.

Figure 1:
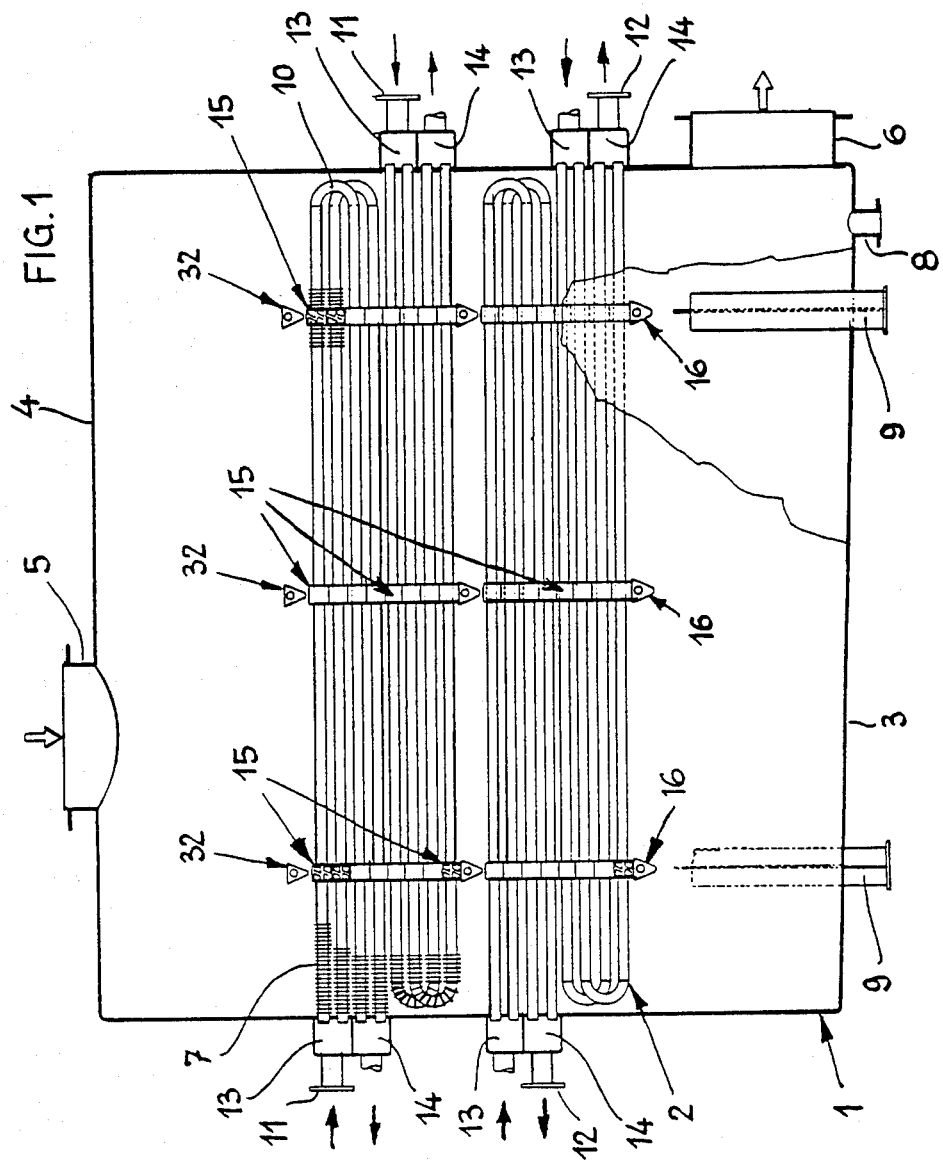
FIG. 1 shows a desublimator in vertical lengthwise section and partially in elevation.
Figure 2:
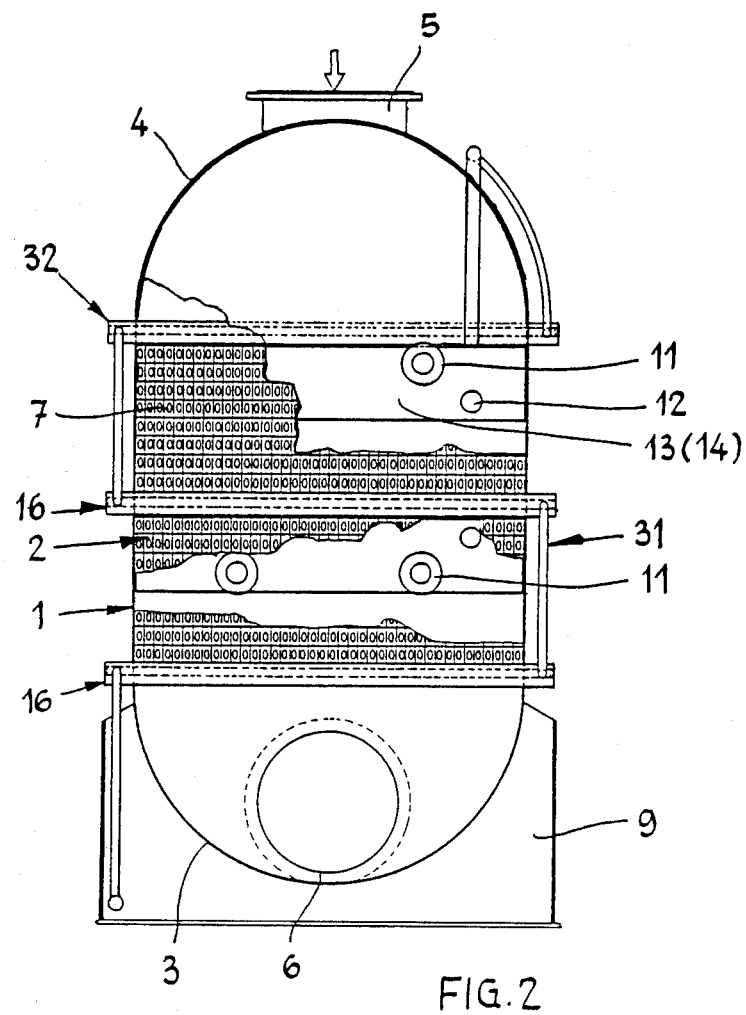
FIG. 2 shows the desublimator of FIG. 1 in end-on view and partially in section.

In FIGS. 1 and 2, the box-shaped housing, of roughly rectangular lengthwise section, of a desublimator is marked 1 and the finned tubes fitted therein are collectively marked 2.

The bottom 3 and top 4 of the housing 1 are of semicircular, ie. shell-like, construction. 5 is the inlet nozzle for the reaction gas, in the top 4, and 6 the outlet nozzle, in the bottom 3. The product which, during the heating and melting-off phase, melts off the finned tubes 7 is taken off through a discharge nozzle 8 in the housing bottom 3. The housing 1 can be fixed by means of supporting legs 9 on a suitable setting-up surface.

As is further clear from FIG. 1 in conjunction with FIG. 2, the finned tubes 7 are arranged in mutually superposed double rows, successive finned tubes 7 of each row being connected together at one end, hairpin-fashion, by pipe bends 10 and being provided, at the opposite end, with means of connection to the inlet and outlet lines of the cooling or heating medium. These means of connection consist of connecting flanges 11 for the inlet line or 12 for the outlet line, and of distributing and collecting chambers, 13 and 14 respectively, which each connect together the free ends of each row of tubes.

The heating and cooling medium used is advantageously water or oil, the mean cooling medium temperature in the charging phase being about 50° C. and the mean heating medium temperature for melting off the product being about 200° C.

Finally, FIG. 1 also shows that in the end regions and in the middle of the length of each finned tube 7 cage-like perforated sliding shoes 15 which surround the finned tube 7 in a box-like manner are mounted on each finned tube. Finned tubes 7 which are adjacent to one another in the height direction rest loosely on one another by means of the sliding shoes 15, and, as shown in FIG. 4, the shoes also serve as a lateral support and guide of finned tubes 7 adjacent to one another in each row of tubes. The sliding shoes 15 of the individual finned tubes 7 of all the rows of tubes are thus directly stacked, column-like, one above the other and, at the lower end, also rest loosely on common supporting girders 16 attached to the housing wall in the lower end region of the housing 1.

Figure 3:
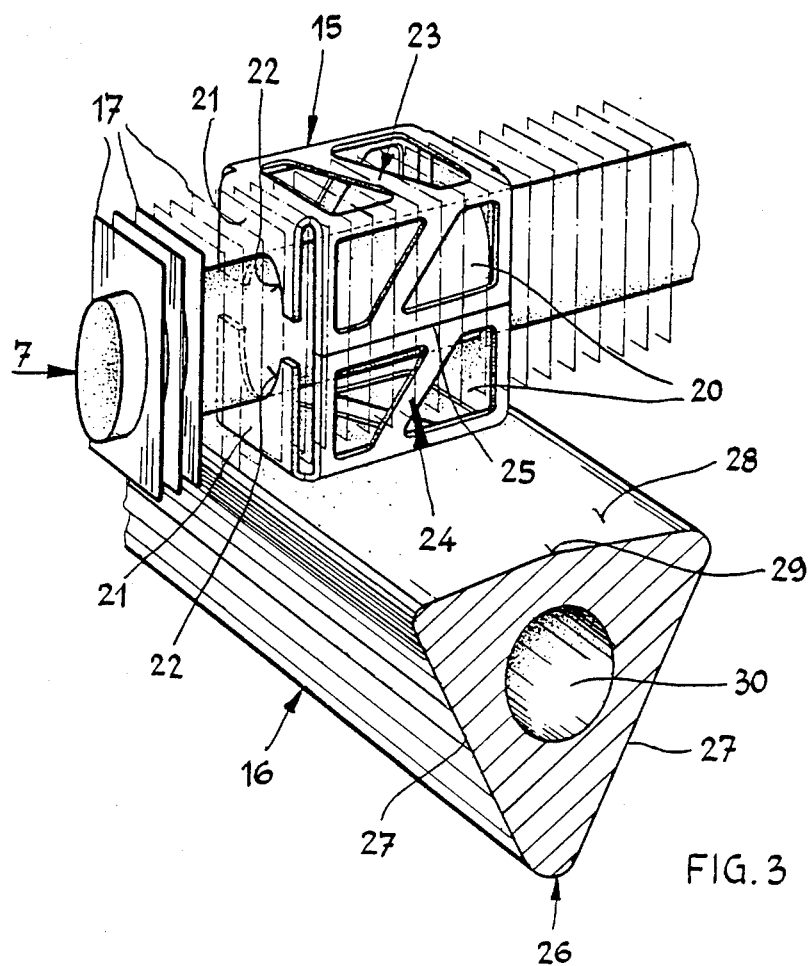
FIG. 3 shows a perspective view of the manner of attachment of a sliding shoe on a finned tube, and its manner of support on a supporting girder

As is shown in FIGS. 3 and 4, the tubes 7 have an oval cross-section and rectangular fins 17. The sliding shoes 15 have a rectangular cross-section which approximately matches the fin size, the vertical side walls 18 of the shoes resting tightly against the lateral edges of the fins, whilst a free gap A, of only a few millimeters, is left between the horizontal side walls 19 of the shoes and the fin edges. As may be seen in particular from FIG. 3, all side walls 18, 19 of the box-like sliding shoe 15 are provided with relatively large perforations 20, which are of approximately triangular or trapezoid shape. The total size of these perforations 20 is about 50% of the wall surface areas.

The end walls 21 of the box-shaped sliding shoes 15 have edge recesses 22 (FIG. 3), corresponding to the cross-section and outline of the core tubes 7, and serving to support the sliding shoes 15 on the core tubes 7. At the same time, they serve as spacers and supporting webs for transmitting the loads of the entire finned tube system to the bottom supporting girder 16, and are of appropriate dimensions.

The sliding shoes 15, provided separately for each finned tube 7, rest directly but loosely on one another by the surfaces of their horizontal side walls 19, so that as thermal expansion occurs the tube 7 or sliding shoes 15 can move relative to one another without interfering with satisfactory resting of the finned tube packet on the lower supporting girders 16.

FIG. 4 shows, in this context, that whilst the superposed sliding shoes 15 are staggered in a horizontal plane, so that there is a slight overlap, the finned tubes 7 are superposed on one another accurately in the same vertical plane V.

As can be seen particularly clearly from FIG. 3, the sliding shoes 15 are composed of two symmetrical box-like lengthwise halves 23, 24, which have a U-shaped cross-section and are firmly welded to one another along the flush-abutting leg edges at 25, so as to trap the finned tubes 7 and form a closed unit therewith.

The two box halves 23, 24 of the sliding shoes 15 are produced, for example, for punching an about 3 mm thick steel sheet billet. The perforations 20 are punched out simultaneously. Thereafter, the punched sheet is bent at an angle of 90° at what subsequently forms the lengthwise and crosswise edges, so that the box shape shown in the drawing results.

In the embodiment shown, the supporting girders 16 have, in cross-section, the outline of a triangle with its apex 26 pointing downward (cf. FIGS. 1, 3 and 4). The triangle has sides 27 of equal length (FIG. 3). The substantially horizontal upper lengthwise surface 28 is, in cross-section, slightly convex or roof-shaped, to form a flat lengthwise ridge 29. The apex 26 is rounded.

Further, FIGS. 3 and 4 show that the supporting girder 16 consists of a hollow profile. This can be an extruded profile with a continuous lengthwise bore 30.

The lengthwise bores 30 of the supporting girders 16 are connected, in the manner shown in FIG. 2, to a closed pipeline system 31 for passage of a heating medium during the melting-off phase.

Finally, FIG. 1 shows that the uppermost finned tube bundle in the housing is additionally secured against vertical shift or distortion by means of additional supporting girders 32 bearing on its top face in the region of the sliding shoe stack. These supporting girders 32 are also connected to the pipeline system 31, in the manner discernible in FIG. 2.

We claim:

1. A desublimator for isolating sublimation products from reaction gases, including a closed housing for the reception or passage of the reaction gas and a plurality of rows of finned tubes accommodated horizontally and superposedly therein, for alternate internal exposure to a heating medium or cooling medium, in which desublimator the reaction gas is passed downward crosswise to the finned tubes and flow of heating medium or cooling medium therein, the successive superposed finned tubes of each row being alternately connected together at one end, by a hairpin-shaped bend, and being provided, at the opposite end, with connections for introducing and discharging the heating medium or cooling medium, the improvement comprising: cage-like perforated sliding shoes on the superposed tubes being supported, and mutually spaced, with limited adjustability, by means of said cage-like perforated sliding shoes surrounding said tubes in a box-like manner, the sliding shoes of the individual finned tubes of all rows of tubes or groups of tubes being directly stacked one above the other and resting loosely on common supporting girders anchored to the housing, wherein the supporting girders have, in cross-section, the outline of a triangle with its apex being rounded and pointing downward and having a slightly convex upper surface forming a flat lengthwise ridge thereon.

2. A desublimator as defined in claim 1, wherein the cross-sectional shape of the supporting girders is that of an isosceles triangle.

3. A desublimator as defined in claim 1, wherein the supporting girder has a hollow profile.

4. A desublimator as defined in claim 1, wherein the supporting girder is an extruded solid profile having a continuous lengthwise bore.

5. A desublimator as defined in claim 4, wherein the lengthwise bore of the supporting girder is connected to a closed pipeline system for the passage of a heating medium during the melting-off phase.

6. A desublimator as defined in claim 1, wherein the uppermost finned tube bundle in the housing is additionally secured against vertical shift or distortion by means of supporting girders bearing on its top face in the region of the sliding shoe stack.

7. A desublimator as defined in claim 1, wherein the supporting girders are positioned crosswise to the said finned tubes.

* * * * *